May 12, 1942.  A. E. PARKER  2,282,741
APPARATUS FOR MEASUREMENT
Filed June 9, 1938  2 Sheets-Sheet 1

Inventor
Allen E. Parker
per
A. J. Nydick
Attorney

May 12, 1942.   A. E. PARKER   2,282,741
APPARATUS FOR MEASUREMENT
Filed June 9, 1938   2 Sheets-Sheet 2

Inventor
Allan E. Parker
per A. J. Nydick
Attorney

Patented May 12, 1942

2,282,741

UNITED STATES PATENT OFFICE 2,282,741

APPARATUS FOR MEASUREMENT

Allan E. Parker, Yonkers, N. Y., assignor of one-half to Electrical Testing Laboratories, a corporation of New York, and one-half to Food Research Laboratories, Inc., a corporation of New York Application June 9, 1938, Serial No. 212,747

9 Claims. (Cl. 88—14)

This invention relates to an improved apparatus for measurement, and more particularly to the accomplishment thereof by photo-electric effects.

Photo-electric cells are used in nephelometry, colorimetry and cognate photo-metric procedures. Such use has depended upon the response of these cells to the effect of radiant energy, which produces appreciable electron emission therein. The current so generated may be detected and/or amplified by means of thermionic tubes and the output thereof may readily be measured.

In photo-metric procedures where transmissibility of light, either visible or invisible, is the subject of inquiry, the apparatus consists of a source of radation, means for interposing the specimen whose transmissibility is being investigated in the light path, means for impinging such radation on a photo-cell, and usually electrical means for determining the magnitude of the alteration in the current produced within the cell by the insertion of the specimen. If an object be placed between the source of radiation and the cell, thereby reducing the quantity of radiation reaching the cell, there results a decrease in electron emission. The magnitude of the current produced under this condition may be determined. The difference between the determination obtained with the light path unobstructed and that with the specimen in the light path is a measure of the absorption effect of the interposed object and, conversely, a measure of the transmissibility thereof.

The absorption characteristics of substances are conveniently expressed in terms of their extinction coefficients. The extinction coefficient of a substance is the logarithm of the reciprocal of the transmission. Conventionally, it is represented by "E" for a particular thickness and a particular concentration, and can be expressed mathematically as $$E = \frac{1}{ct} \log \frac{1}{T}$$

where
$c$ denotes the concentration of the solute
$t$ denotes the thickness of the layer of the sample being investigated
$T$ denotes the transmission at a particular wave length.

$c$ and $t$ are expressed in terms of the concentration and thickness, respectively, for which the extinction coefficient is defined.

The adaptability of photo-cells to various uses depends upon their sensitivity to the light conditions in which they are used. It has been found that certain alkali metal photo-cells, especially sodium, are most effective in the ultra-violet portion of the spectrum. Photometric procedures have been used for determining the characteristics of materials, particularly their power to absorb light incident upon them.

For the purpose of measuring absorption characteristics, there have been used spectrographs, spectrometers, monochromators, photographic devices, photo-electric devices and combinations thereof. These procedures have been intricate and/or laborious, costly to install and to operate. Some of the methods have involved difficult calibrations and have required specialized technique and skill on the part of the operator.

The absorption properties of any substance throughout the entire spectrum are physical characteristics of that particular substance. In the absence of, or by correcting for the presence of other substances, having similar characteristics, the spectral absorption can be used as a means of identification. Furthermore, the degree of absorption at a particular wave length, due allowance being made for interfering substances, solvents, containers, etc., can be used as a measure of the concentration of a substance.

As an example of this procedure, vitamin A is characterized by the property of absorbing ultra violet light. It exhibits a maximum absorption at a wave length of approximately 328 millimicrons. By adjusting the procedure to correct for interfering substances, and the container, insofar as these may also absorb radiation, at a wave length of 328 millimicrons, the magnitude of the absorption at this wave length affords a means for measuring vitamin A content.

The purpose of this invention is to provide means which will enable one rapidly and precisely to make photometric measurements; that are simple in operation; that avoid the use of expensive optical accessories; that may be economically assembled and readily repaired; that minimize the necessity for complicated calibrations; that afford means for the direct reading of the extinction coefficient.

Other objects of this invention will appear hereafter in the detailed description thereof in connection with the accompanying drawings, wherein.

Figure 1:
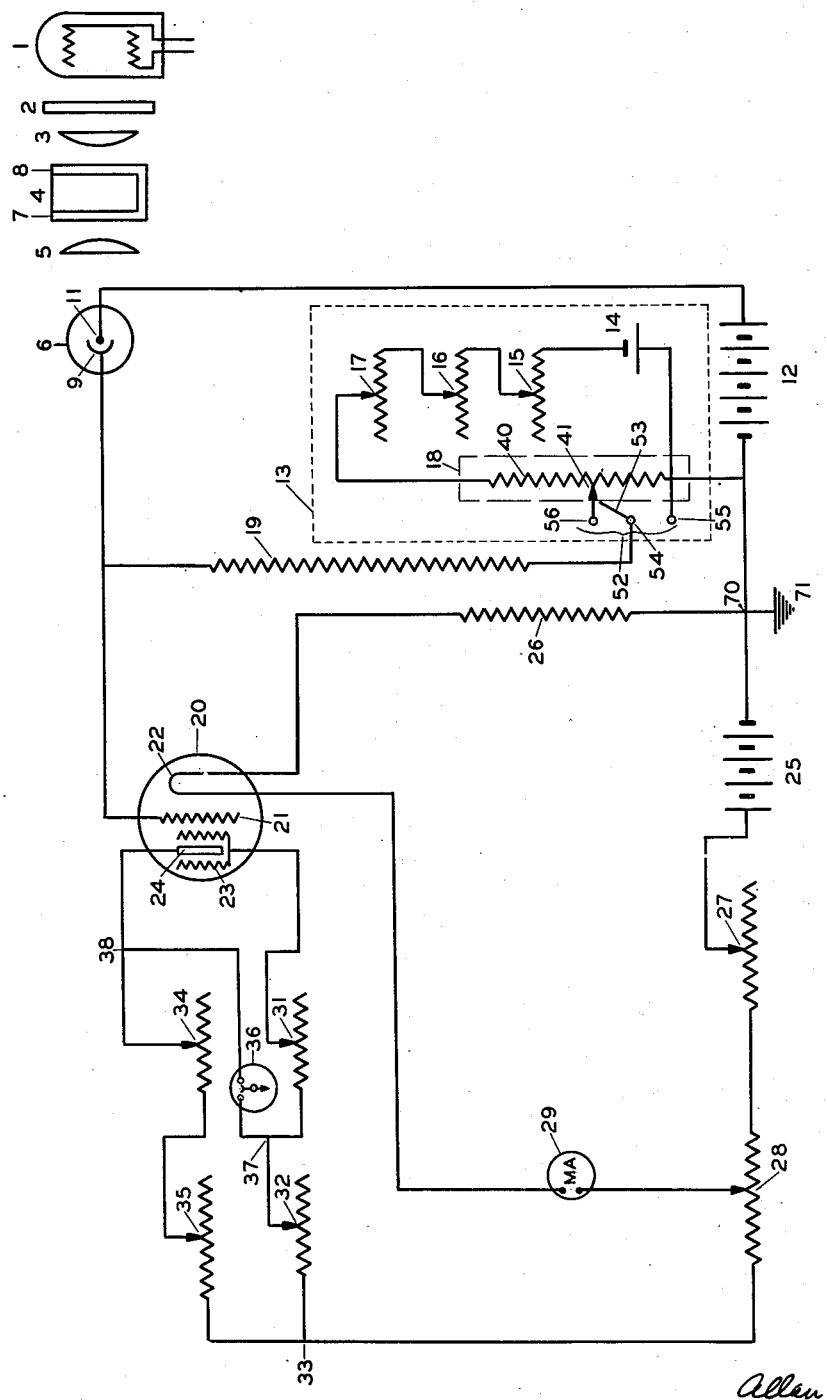
Fig. 1 is a schematic diagram of an arrangement showing a source of radiation and a photo-electric circuit responsive thereto. Interposed between them are shown a light filter and a sample, the extinction coefficient of which is being measured.
Figure 2:
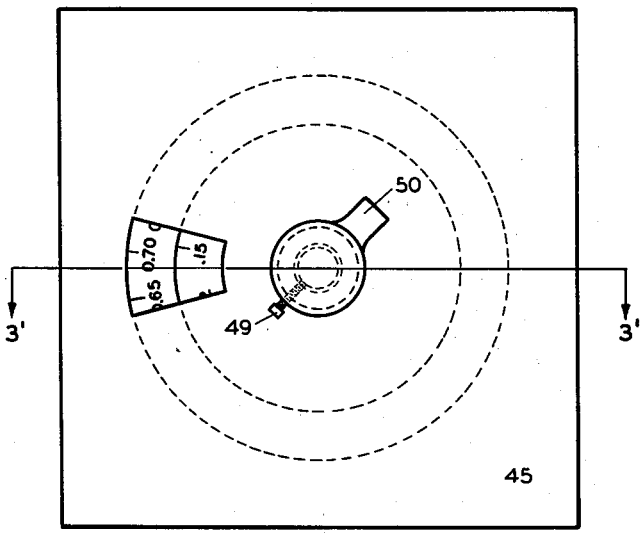
Fig. 2 is a plan view of the top of the potentiometer housing, showing the adjustment knob and a visible portion of the measuring scales.

The present invention resides in the fact that there is used an appropriate light source, filter and measuring means. Specifically, the light source is a sodium arc. This arc emits discrete spectral lines of sodium, among which are two at a wave length of approximately 328 millimicrons, specifically at 330.234 and 330.294 millimicrons. These lines are isolated from the remaining spectral lines by appropriate light filtering means. It has been found that a "Corex A, Corning No. 986 filter," in conjunction with a sodium photoelectric cell, produces excellent monochromatization. By this means one obtains monochromatic radiation of the desired wave length without the use of dispersing apparatus for the reason that radiation of other wave lengths is either absorbed by the filter, or is outside the limits of the spectral response of the photocell.

The combination of the sodium arc and the aforesaid "Corex A" filter and the sodium photocell is superior to other light sources and filters which yield a broader spectral distribution. The sodium photocell responses are detected by an "F. P. 54" electrometer tube. The extinction coefficient of the sample under investigation is directly determined by the use of an appropriately designed logarithmic scale mounted on the potentiometer adjustment knob.

In the drawings, 1 denotes a sodium arc, and 2 denotes a "Corex A, Corning No. 986 filter." An appropriate sample container 4 may be used for interposing the material under investigation between the light filter 2 and the photocell 6. The rays from 2 are made parallel by a lens 3, or other appropriate device. By means of another lens 5 the light transmitted by 4 is focussed upon the photocell 6. The container or cell 4 is transparent to the radiation which is used in the investigation. A quartz cell, or a cell provided with a transparent window may be employed therefor. It is also possible to construct the sample holder 4 with one or both of its walls 7 and 8 made of the filtering material used for 2. In this way the need for the independent filter 2 may be eliminated.

Figure 5:
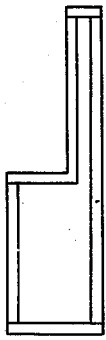
Fig. 5 is a plan view of an echelon sample cell or container.

If the absorption characteristics of a material at various thicknesses are desired, one may use a series of sample holders 4 of various distances of separation between walls 7 and 8, or, more conveniently, an echelon cell, as illustrated in Fig. 5. The latter form of cell will afford more rapid operation of the instrument for determinations of the absorption or transmission of the material under investigation.

The sodium photocell 6 consists of a cathode 9 and an anode 11. Cell 6 is arranged in circuit with two sources of potential 12 and 13. Approximately 90 volts is supplied by 12. The source of potential denoted by 13 consists of a system comprising a battery 14 supplying approximately 1.5 volts, variable resistances 15, of approximately 50 ohms, 16, of approximately 500 ohms, and 17, of approximately 6000 ohms, and a potentiometer 18. The potential system 13 is enclosed by the dotted lines, while the potentiometer 18 is enclosed by the dash lines. The potentiometer 18 has a total resistance of approximately 150 ohms. The potential sources 12 and 13 are connected in series with the photocell 6 and a fixed resistance 19 of approximately 100 megohms. This resistance 19 is connected directly to the cathode 9 of the photocell 6.

This cathode 9 is also connected to the control grid 21 of an electrometer tube 20, which is used to detect the variation in the photocell output. The electrometer tube 20 consists of a filament 22, a control grid 21, a screen grid 23 and a plate 24. The source of potential for tube 20 is a battery 25 of approximately 12 volts. The negative terminal of 25 is connected to the negative terminal of 12 and the positive terminal of 14. The juncture 70 thereof is connected to a ground 71. Filament 22 is connected in series with battery 25, a fixed resistance 26 of approximately 50 ohms, a variable resistance 27 of approximately 25 ohms, a variable resistance 28 of approximately 50 ohms, and a milliammeter 29, the range of which is 0.0 to 100 milliamperes. The milliammeter is used to observe the gradual degradation of the electrometer tube 20. The screen grid 23 is connected to a variable resistance 31 of approximately 2000 ohms and a variable resistance 32 of approximately 4000 ohms, and to the resistance 28 at point 33.

The plate 24 is connected to a variable resistance 34 of approximately 200 ohms, a variable resistance 35 of approximately 10,000 ohms, and the variable resistance 35 is connected to the resistance 28 at the point 33.

A galvanometer 36 is connected into the screen grid 23 circuit at point 37 and into the plate 24 circuit at point 38.

Control grid 21 must always be connected to either point 55 or point 56 to prevent it from being at liberty to assume a fluctuating potential. To accomplish this, a switch 52 is so constructed that, when knife edge 53, which is permanently connected to point 54, is swung from contact with 55 to 56, or vice versa, the connection between points 54 and 55 is not broken until after the connection between point 54 and point 56 has been effected, or vice versa.

Figure 3:
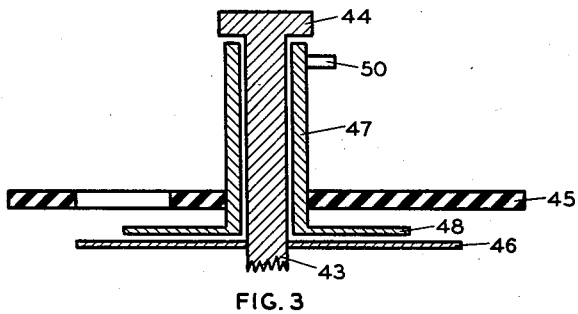
Fig. 3 is a partial cross-sectional view on the line 3'—3' of Fig. 2 looking in the direction of the arrows, showing merely the potentiometer's compound adjustment means and the measuring scales carried thereby.
Figure 4:
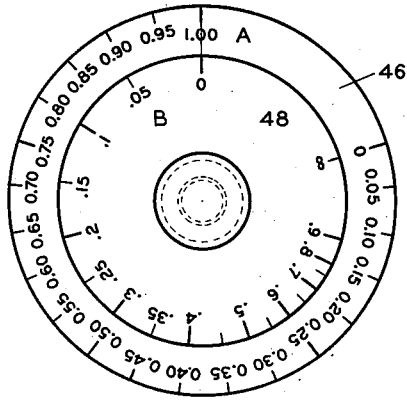
Fig. 4 is a plan view of the potentiometer measuring scales.

The potentiometer 18 comprises a uniform fixed resistance 40 mounted on a moveable drum, and a variable contact 41. The potentiometer may be designed so that the change in relationship of the fixed resistance with the variable contact can be effected by movement of either of these elements. In the present embodiment, however, a moveable drum carrying resistance 40 is attached to a shaft 43, as is customary in the electrical art. That part of the shaft assemblage which is above the drum is illustrated in Fig. 3. Shaft 43 projects up through the top 45 of the potentiometer housing, and is provided with a knob 44 so that the drum may be manipulated.

Attached to 43 is a disc 46 of brass, or other appropriate material, which carries an equal interval scale A graduated from 1.00 to 0.00. This scale may be engraved or engined directly on disc 46, or it may be marked on paper or other appropriate material, and then superposed on the disc 46.

Scale A is calibrated so that point 1.00 corresponds to the maximum auxiliary potential obtainable from 13 when 15, 16 and 17 are fixed. The 0.00 point on said scale corresponds to the absence of any auxiliary potential from 13.

A moveable sleeve 47 of "Bakelite," brass, or other material, surrounds shaft 43. Sleeve 47 is provided with a projection 50 for ease in moving it when necessary. The shaft 43 and the sleeve 47 are free to move independently of each other. A disc 48 is provided, in the same way as disc 46 with a scale B. Said scale B is calibrated on a logarithmic basis so that, when the 0.00 point thereof is coincident with the 1.00 point of scale A, the values on scale B are the logarithms to the base ten of the reciprocals of the corresponding values indicated on scale A. It will be obvious that a logarithmic scale to any other base may also be used.

Sleeve 47 is provided with a set screw 49 by means of which 47 and 43 may be locked together, and thereby produce a locking of scale B with scale A. When thus locked, manipulation of 44 results in the simultaneous movement of both scales.

In the actual use of the instrument, it is found that the absorption of radiation from 1 by the material in 4 is evidenced by a variation in the current flowing in photocell 6. This variation in current causes an alteration of the potential of control grid 21. Hence, a variation in the potential between points 37 and 38 is observed. This variation in potential is counterbalanced by an adjustment of the potentiometer 18. The adjustment of 18 gives a measure of the transmission of the solution, or of its extinction coefficient.

The actual operation of the equipment is carried out as follows: With the photocell 6 unilluminated and switch 52 positioned to connect point 54 to point 55, the rheostat 27 is varied until a minimum position is observed for the deflections of the galvanometer 36. Following this, rheostats 35 and 34 are adjusted so that the position of this minimum deflection of the galvanometer 36 is at the 0.0 point of the galvanometer scale. With these adjustments made, the unobstructed light from lamp 1 is allowed to fall on photocell 6, the sample cell 4 not being in the path of the light beam. When this light is incident upon 6, a deflection of 36 is observed. With switch 52 now thrown so that points 54 and 56 are connected and the drum of the potentiometer 18 set for its maximum reading, i. e., 1.00 on scale A, the rheostats 15, 16 and 17 are adjusted so that the galvanometer indication is again 0.0. This setting places the instrument in adjustment preliminary to the actual measurement of the transmission or extinction coefficient of a specimen. Sample cell 4 filled with a solvent is now inserted in the light path and by adjusting the position of the drum of the potentiometer 18, thereby changing the potential supplied by 13, so as again to restore the galvanometer to a reading of 0.0, a value is obtained on scale A which is the transmission of the cell and solvent combined.

To determine the extinction coefficient of the solution of a substance, as for instance, vitamin A active material, scale B is now locked or damped by means of set screw 49, so that the 0.00 point of scale B coincides with the point on scale A determined by the measurement of the sample cell and solvent combined. The operator now inserts the solution of the unknown to be measured in the cell 4, and adjusts potentiometer 18 so that the galvanometer 36 is rebalanced to its 0.0 reading. The reading of the potentiometer which is now obtained on scale A gives the joint transmission of the cell 4 and the solution of the unknown substance, while the reading on scale B gives directly the extinction coefficient of the solute being measured.

It will be understood that the showing of the apparatus is very diagrammatic and that the invention is capable of many refinements and variations, which will readily occur to those skilled in the art.

It is further contemplated that the apparatus may be incorporated in a single unit or in separate units, as desired.

It will be seen from the above description of my invention that absorption characteristics of materials may readily be determined by means of alterations in photo-electric responses produced by said substances. The apparatus can be used for such determinations at various wave lengths, by suitable variations in the primary source of radiation and/or the light filtering means. The important advantages reside in this breadth of use and the direct reading of the extinction coefficient on my novel potentiometer drum measuring scale.

I claim:

1. Apparatus for determining a magnitude having a related photo-electric effect measurable potentiometrically comprising in combination: means for producing said photo-electric effect which includes, a source of radiant energy, means for selection therefrom of radiation having a particular wave length, a photo-electric cell responsive to said selected energy; the said cell being arranged in circuit with two sources of potential, the first source supplying a fixed potential, and the second source comprising a system for supplying a variable potential which includes, a source of potential, a variable resistance system and a potentiometer; and thermionic tube means for detecting the response of the photo-electric cell comprising, a control grid connected to the cathode of the photo-electric cell, a variable resistance system connected to the plate of the thermionic tube, a variable resistance system connected to the screen grid of the thermionic tube, and a galvanometer bridging the screen grid and the plate of the thermionic tube.

2. Apparatus for determining a magnitude having a related photo-electric effect measurable potentiometrically comprising in combination: means for producing said photo-electiric effect which includes, a source of radiant energy, means for selection therefrom of radiation having a particular wave length, a photo-electric cell responsive to said selected energy; the said cell being arranged in series circuit with two sources of potential, the first source supplying a fixed potential, and the second source comprising a system for supplying a variable potential which includes, a source of potential, a variable resistance system and a potentiometer; and thermionic tube means for detecting the response of the photo-electric cell comprising, a control grid connected to the cathode of the photo-electric cell, a variable resistance system connected to the plate of the thermionic tube, a variable resistance system connected to the screen grid of the thermionic tube, and a galvanometer bridging the screen grid and the plate of the thermionic tube.

3. Apparatus for determining a magnitude having a related photo-electric effect measurable potentiometrically comprising in combination: means for producing said photo-electric effect which includes, a source of radiant energy, means for selection therefrom of radiation having a particular wave length, a photo-electric cell responsive to said selected energy; the said cell being arranged in series circuit with two sources of potential and a fixed resistance, the first source supplying a fixed potential, and the second source comprising a system for supplying a variable potential which includes, a source of potential, a variable resistance system and a potentiometer; and thermionic tube means for detecting the response of the photo-electric cell comprising, a control grid connected to the cathode of the photo-electric cell, a variable resistance system connected to the plate of the thermionic tube, a variable resistance system connected to the screen grid of the thermionic tube, and a galvanometer bridging the screen grid and the plate of the thermionic tube.

4. Apparatus for determining a magnitude having a related photo-electric effect measurable potentiometrically comprising in combination: means for producing said photo-electric effect which includes, a source of radiant energy, means for selection therefrom of radiation having a particular wave length, a photo-electric cell responsive to said selected energy; the said cell being arranged in series circuit with two sources of potential and a fixed resistance connected to the cathode of the photo-electric cell, the first source supplying a fixed potential, and second source comprising a system for supplying a variable potential which includes, a source of potential, a variable resistance system and a potentiometer; and thermionic tube means for detecting the response of the photo-electric cell comprising, a control grid connected to the cathode of the photo-electric cell, a variable resistance system connected to the plate of the thermionic tube, a variable resistance system connected to the screen grid of the thermionic tube, and a galvanometer bridging the screen grid and the plate of the thermionic tube.

5. Apparatus for determining a magnitude having a related photo-electric effect measurable potentiometrically comprising in combination: means for producing said photo-electric effect which includes, a source of radiant energy, means for selection therefrom of radiation having a particular wave length, a photo-electric cell responsive to said selected energy; the said cell being arranged in circuit with two sources of potential, the first source supplying a fixed potential, and the second source comprising a system for supplying a variable potential which includes, a source of potential, a variable resistance system and a potentiometer, the potentiometer comprising, moveable means for varying the resistance of the instrument, and connected with said means a scale for measuring potential calibrated to indicate the magnitude under observation; and thermionic tube means for detecting the response of the photo-electric cell comprising, a control grid connected to the cathode of the photo-electric cell, a variable resistance system connected to the plate of the thermionic tube, a variable resistance system connected to the screen grid of the thermionic tube, and a galvanometer bridging the screen grid and the plate of the thermionic tube.

6. Apparatus for determining a magnitude having a related photo-electric effect measurable potentiometrically comprising in combination; means for producing said photo-electric effect which includes, a source of radiant energy, means for selection therefrom of radiation having a particular wave length, a photo-electric cell responsive to said selected energy; the said cell being arranged in circuit with two sources of potential, the first source supplying a fixed potential, and the second source comprising a system for supplying a variable potential which includes, a source of potential, a variable resistance system and a potentiometer, the potentiometer comprising, moveable means for varying the resistance of the instrument, attached to said moveable means a scale calibrated to indicate said magnitude, a freely moveable second scale calibrated to indicate a magnitude related to that of the first mentioned scale, and means for cooperatively engaging the second scale with the first mentioned scale; and thermionic tube means for detecting the response of the photo-electric cell comprising, a control grid connected to the cathode of the photo-electric cell, a variable resistance system connected to the screen grid of the thermionic tube, a variable resistance system connected to the plate of the thermionic tube, and a galvanometer bridging the screen grid and the plate of the thermionic tube.

7. Apparatus for determining the extinction coefficient of a substance comprising in combination: a photo-electric cell responsive to the absorption characteristics of the substance; the said cell being arranged in circuit with two sources of potential, the first source supplying a fixed potential, and the second source comprising a system for supplying a variable potential which includes, a source of potential, a variable resistance system and a potentiometer, the potentiometer comprising, moveable means for varying the resistance of the instrument, attached to said means a scale calibrated to indicate a range of T from 0.0 for full extinction to 1.0 for nil extinction, a freely moveable second scale calibrated on a logarithmic basis with respect to the reciprocals of T as indicated on the first scale, and means for cooperatively engaging the second scale with the first mentioned scale; and thermionic tube means for detecting the response of the photo-electric cell comprising, a control grid connected to the cathode of the photo-electric cell, a variable resistance system connected to the plate of the thermionic tube, a variable resistance system connected to the screen grid of the thermionic tube, and a galvanometer bridging the screen grid and the plate of the thermionic tube.

8. Apparatus as defined in claim 7 wherein the freely moveable second scale is calibrated with respect to the first mentioned scale to indicate E, where $$E = \log_{10} \frac{1}{T}$$

9. Apparatus for determining the extinction coefficient of a substance comprising in combination: a photo-electric cell responsive to the absorption characteristics of the substance; the said cell being arranged in circuit with two sources of potential, the first source supplying a fixed potential, and the second source comprising a system for supplying a variable potential which includes, a source of potential, a variable resistance system and a potentiometer, the potentiometer comprising, moveable means for varying the resistance of the instrument, a shaft connected with the moveable means, attached to the shaft a calibrated scale, a freely moveable sleeve surrounding the shaft, a calibrated scale attached to the sleeve, and means for cooperatively engaging said sleeve with said shaft; and thermionic tube means for detecting the response of the photo-electric cell comprising, a control grid connected to the cathode of the photo-electric cell, a variable resistance system connected to the plate of the thermionic tube, a variable resistance system connected to the screen grid of the thermionic tube, and a galvanometer bridging the screen grid and the plate of the thermionic tube.

ALLAN E. PARKER.